April 12, 1949.   W. L. MORRISON   2,467,219
MULTISTAGE REFRIGERATING APPARATUS
Filed Dec. 21, 1942   8 Sheets-Sheet 6
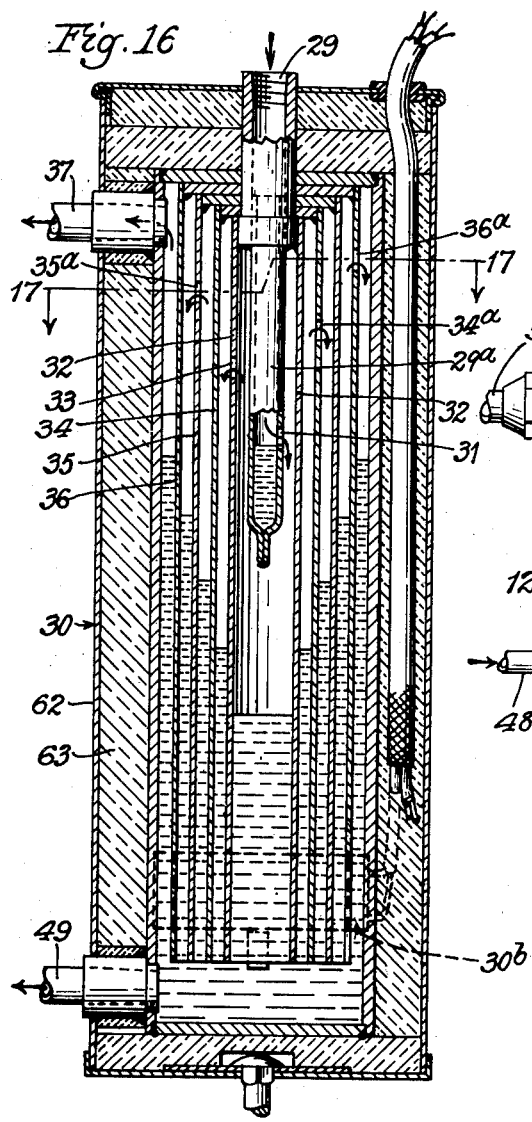
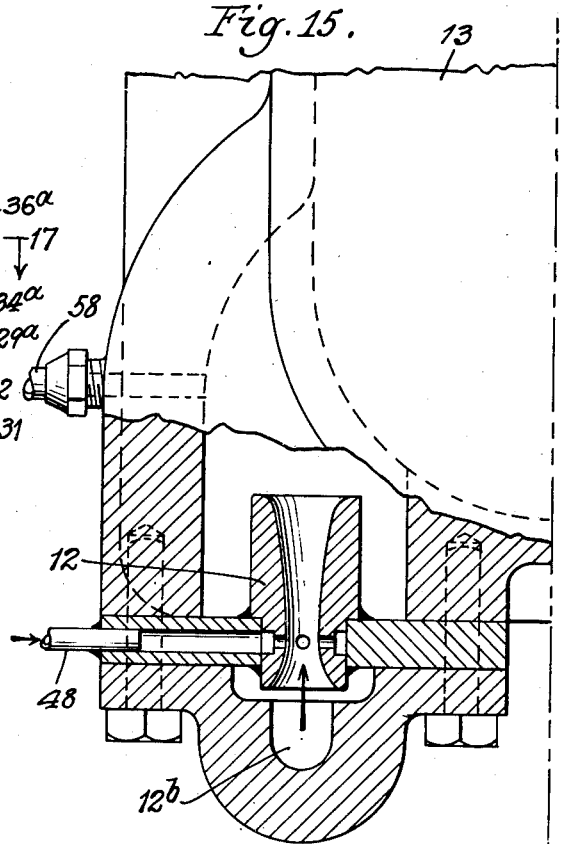
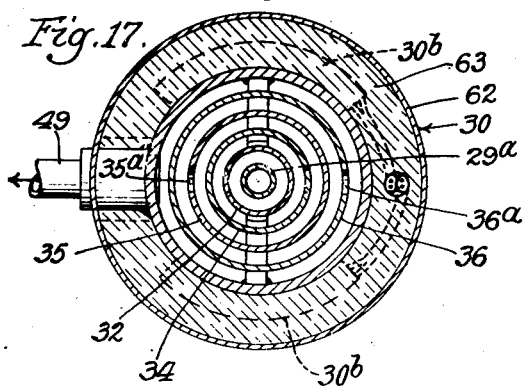
Inventor
Willard L. Morrison
by Parker & Carter
Attorneys.

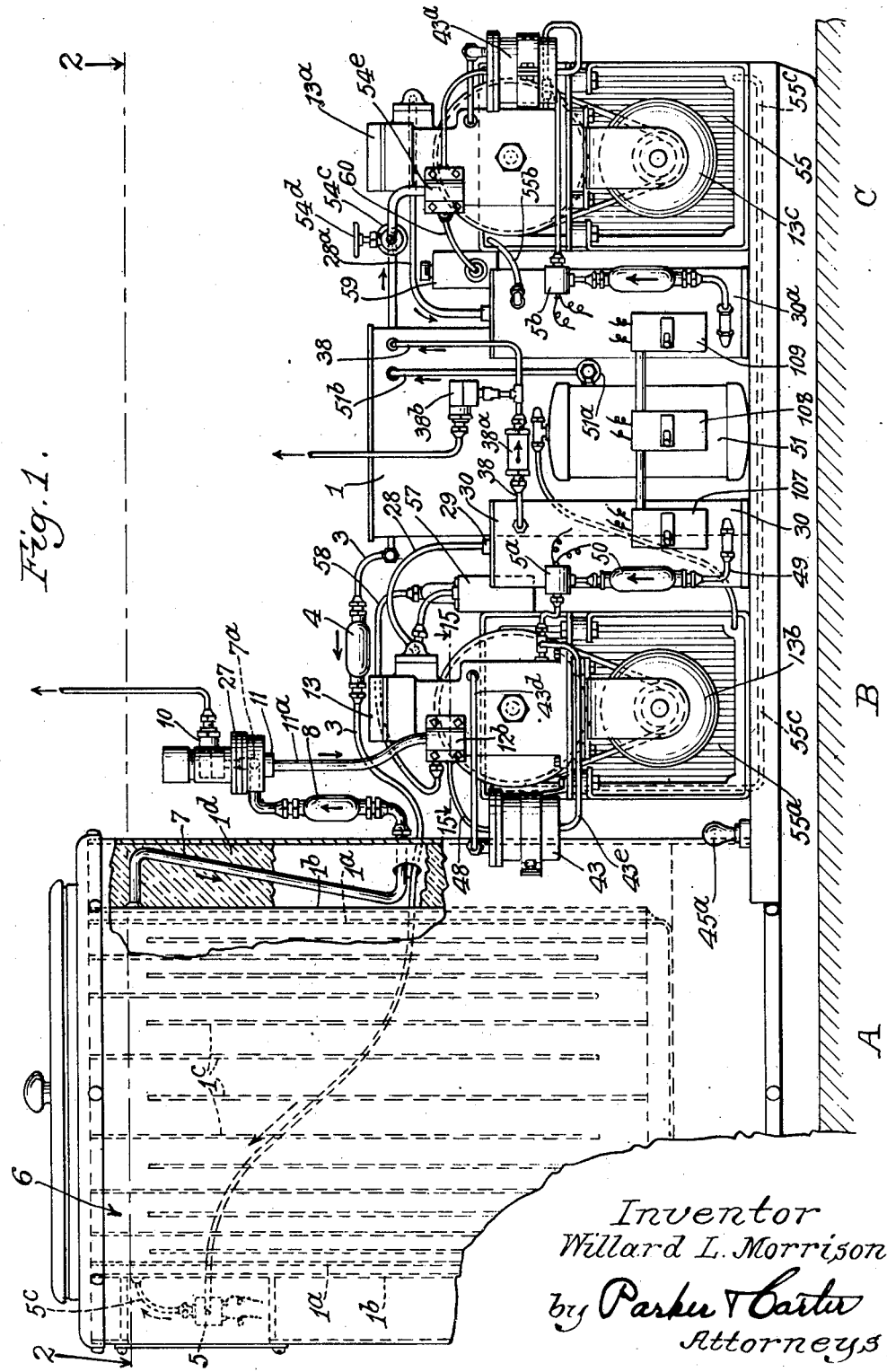

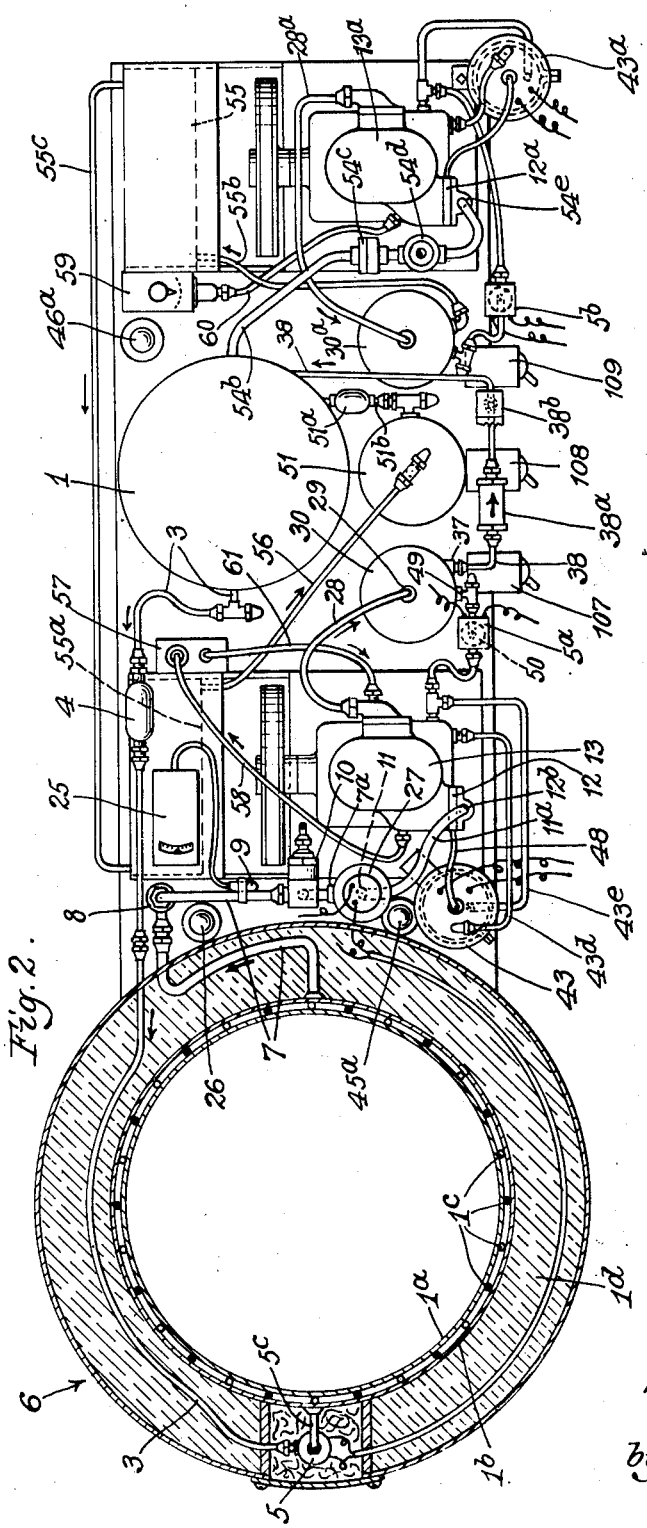

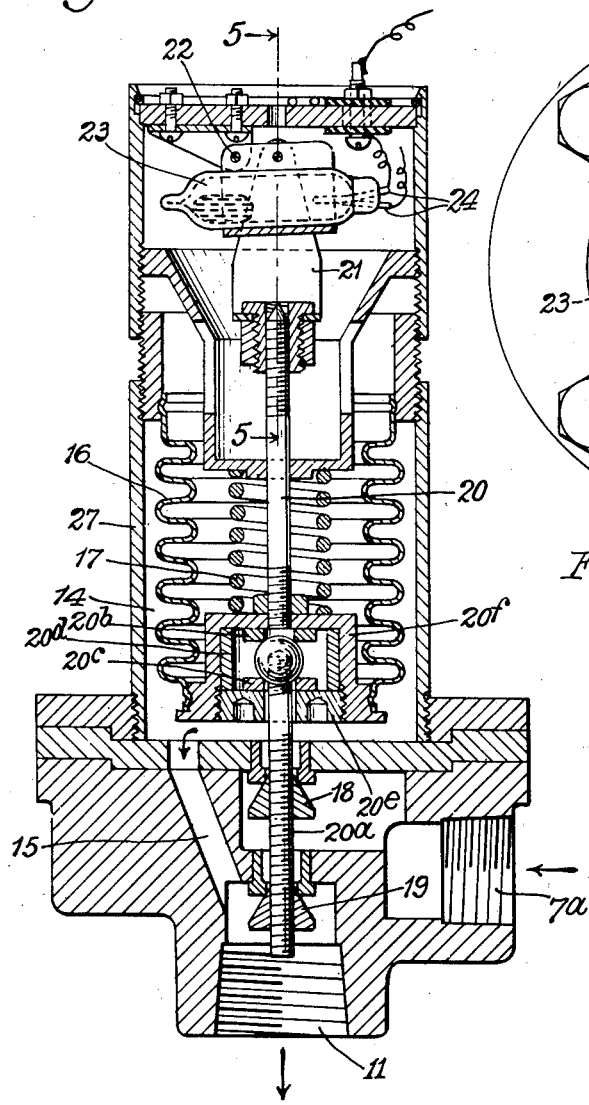
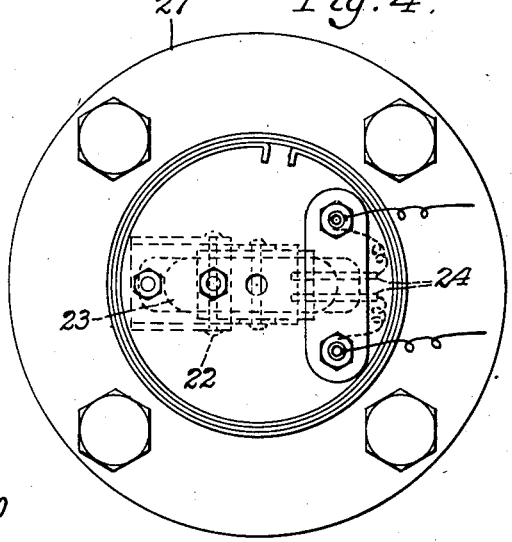
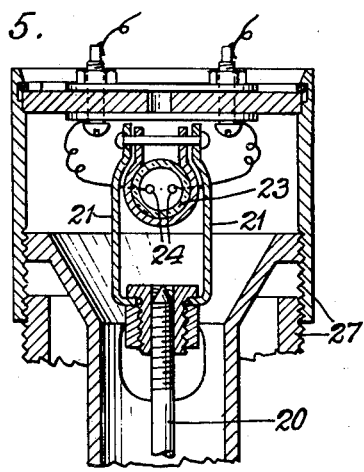

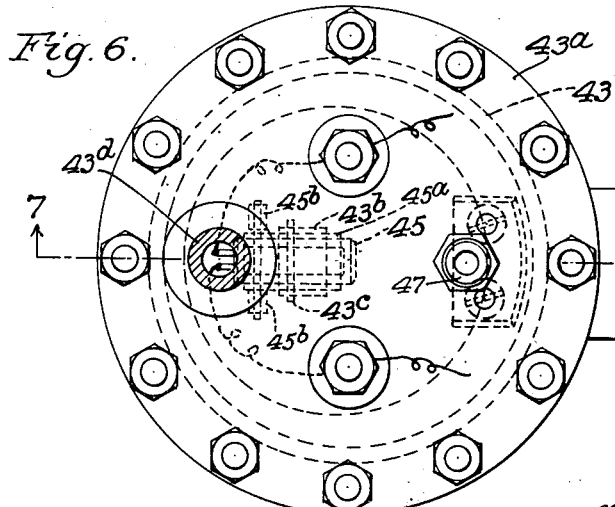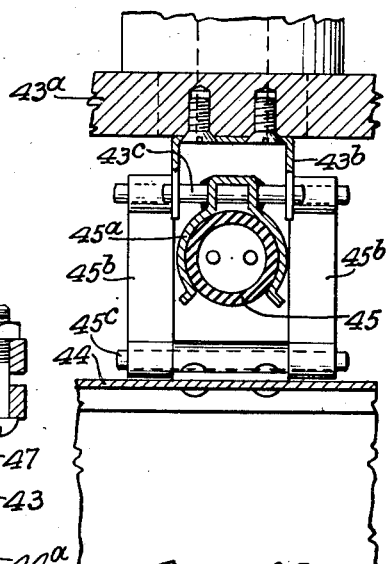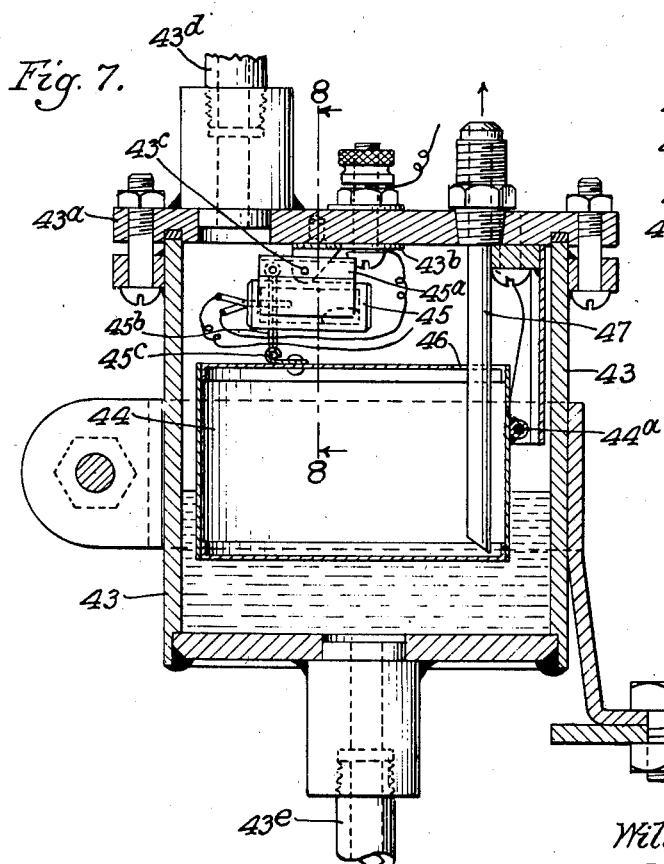

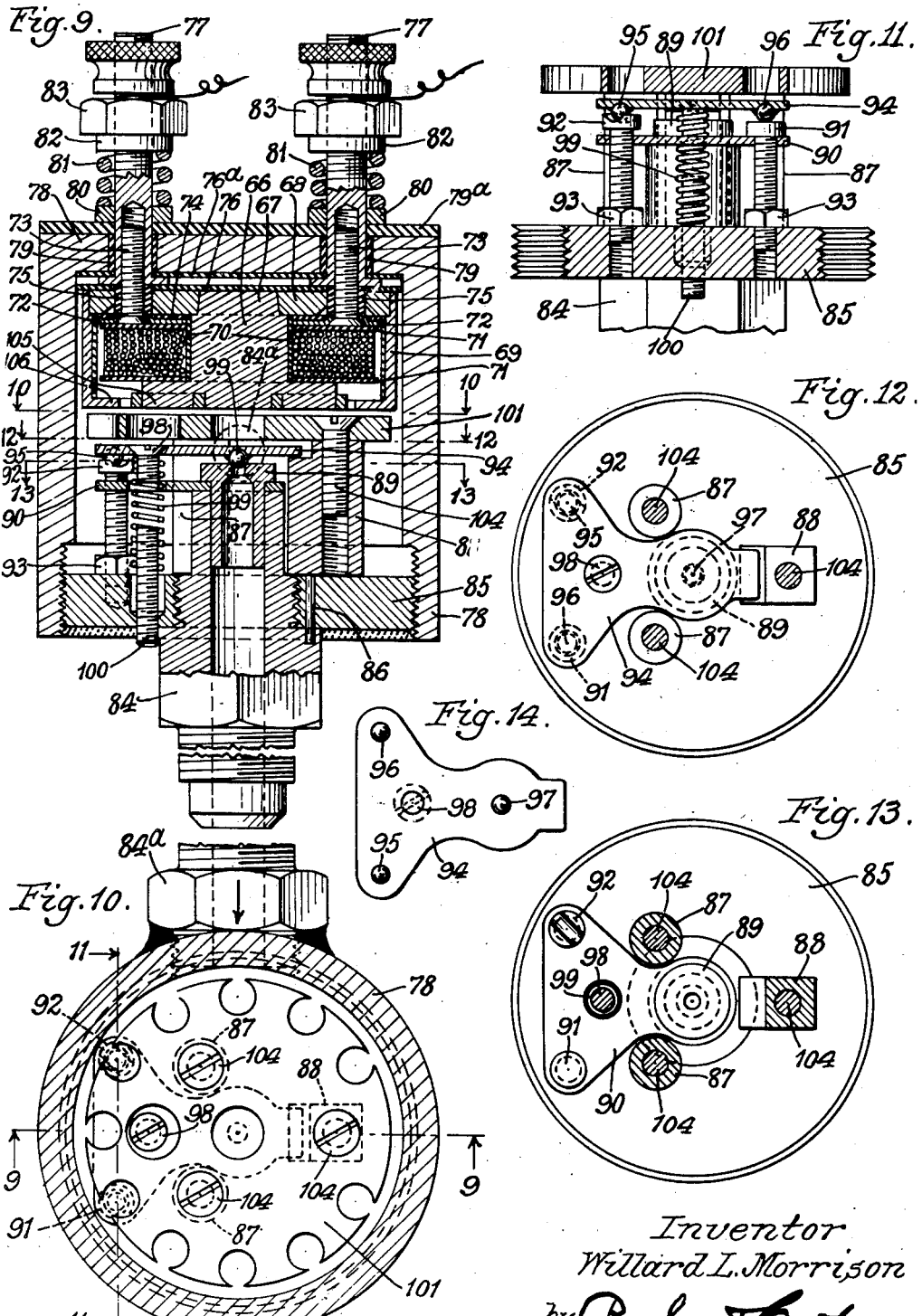

April 12, 1949. W. L. MORRISON 2,467,219
MULTISTAGE REFRIGERATING APPARATUS
Filed Dec. 21, 1942 8 Sheets-Sheet 7
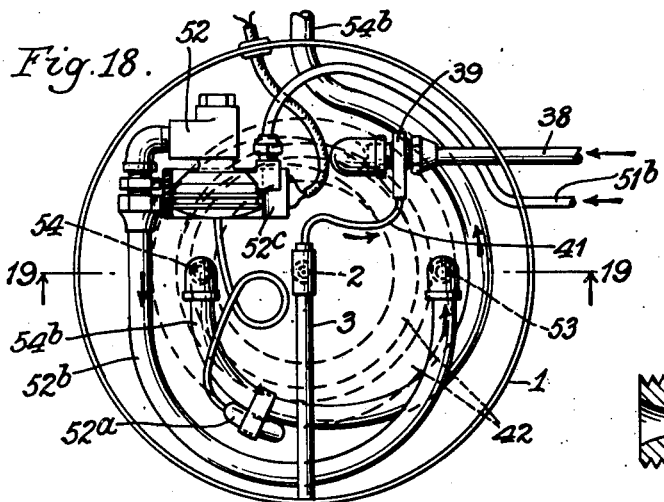
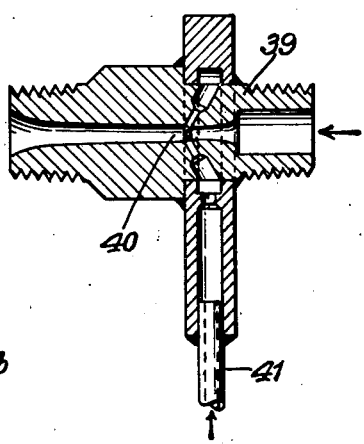
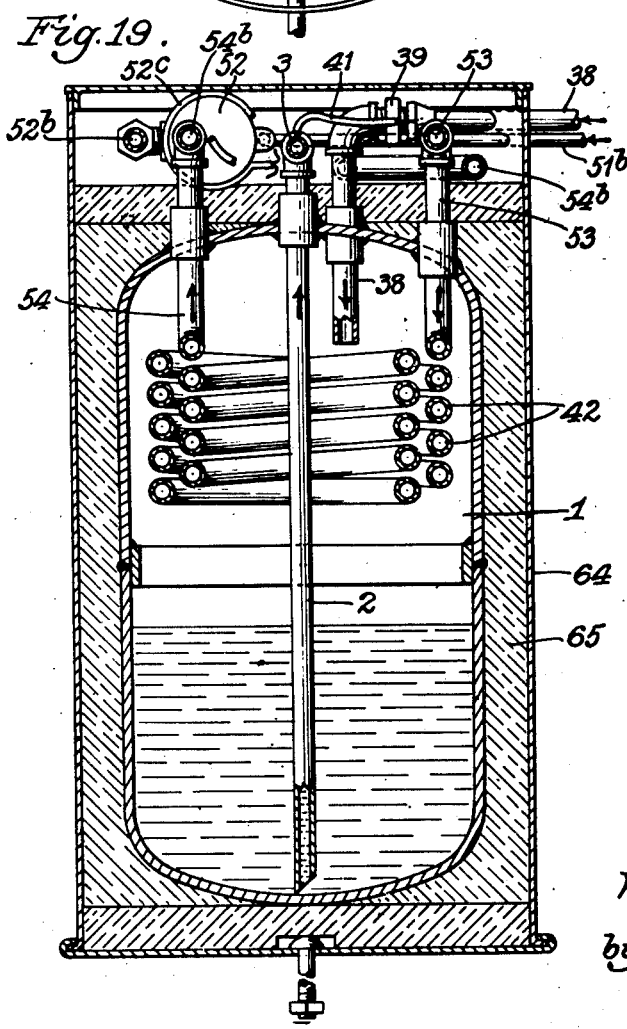
Inventor
Willard L. Morrison
by Parker & Carter
Attorneys.

Patented Apr. 12, 1949

2,467,219

UNITED STATES PATENT OFFICE 2,467,219

MULTISTAGE REFRIGERATING APPARATUS

Willard L. Morrison, Lake Forest, Ill.

Application December 21, 1942, Serial No. 469,672

6 Claims. (Cl. 62—8)

This invention relates to a refrigerating apparatus and has for its object to provide a new and improved apparatus of this description.

The invention has as a further object to provide a refrigerating apparatus whereby a very low temperature, below −120 degrees Fahrenheit, is produced by means of a multistage method.

The invention has as a further object to provide a refrigerating apparatus wherein the heat from the evaporator or cold chamber, in which the low temperature is produced, is first reduced by an intermediate heat exchanger with one refrigerating apparatus, and is then further reduced by another heat exchanger in connection with another refrigerating apparatus.

The invention has as a further object to provide a multistage means for continuously producing a very low temperature, such as −120 degrees Fahrenheit.

In addition to freezing foods, this invention has numerous other uses such as in preserving blood plasma, shrinking one metal part that is to fit into another part so that the parts can be connected by hand without injuring either part, dessicating food products, hardening cutting tools for working on metals, and to emulate the conditions found at the highest altitudes reached by airplanes so that the instruments may be tested under actual low temperature conditions before being installed. This enables the manufacturer to easily, quickly and effectively insure the proper working of the instruments under these high altitudes. In order that the devices in the evaporator may be kept under observation, the evaporator may be provided with a transparent top, or the top may be left off.

The invention has as a further object to provide a refrigerating apparatus for separating the oil from the refrigerant and controlling the oil level.

The invention has as a further object to provide a refrigerating apparatus wherein there is utilized means for spraying liquid refrigerant into the hot gases from the compressor during the process of cooling these hot gases.

The invention has as a further object to provide a refrigerating apparatus wherein there is utilized a float chamber with an open type float and a mercury switch controlled thereby.

The invention has as a further object to provide a refrigerating apparatus wherein the heat is removed from the gas leaving the evaporator in two stages. In the first stage, the heat is extracted by the evaporation of an extremely volatile refrigerant such as ethane, and the second stage is extracted by the use of a different gas such as propane.

The invention has further objects which are more particularly pointed out in the accompanying description.

Referring now to the drawings,

Fig. 1 is a side elevation of one form of device embodying the invention;

Fig. 2 is a sectional view taken on line 2—2 of Fig. 1;

Fig. 3 is a sectional view through one form of throttling contactor;

Fig. 4 is a plan view of the throttling contactor shown in Fig. 3;

Fig. 5 is a sectional view taken on line 5—5 of Fig. 3;

Fig. 6 is a plan view of the float switch;

Fig. 7 is a sectional view taken on line 7—7 of Fig. 6;

Fig. 8 is a sectional view taken on line 8—8 of Fig. 7;

Fig. 9 is a sectional view of the electro-magnetic valve taken on line 9—9 of Fig. 10;

Fig. 10 is a sectional view taken on line 10—10 of Fig. 9;

Fig. 11 is a sectional view taken on line 11—11 of Fig. 10;

Fig. 12 is a sectional view taken on line 12—12 of Fig. 9;

Fig. 13 is a sectional view taken on line 13—13 of Fig. 9;

Fig. 14 is a view of the under side of the valve plate shown in Figs. 9 and 12;

Fig. 15 is a view in part section showing the venturi, taken on line 15—15 of Fig. 1;

Fig. 16 is a longitudinal sectional view through the oil separator;

Fig. 17 is a sectional view taken on line 17—17 of Fig. 16;

Fig. 18 is a plan view of the top of the condenser-receiver with cover removed;

Fig. 19 is a sectional view taken on line 19—19 of Fig. 18;

Fig. 20 is a sectional view of the super-heat suppressing venturi;

Like numerals refer to like parts throughout the several figures.

Figure 21:
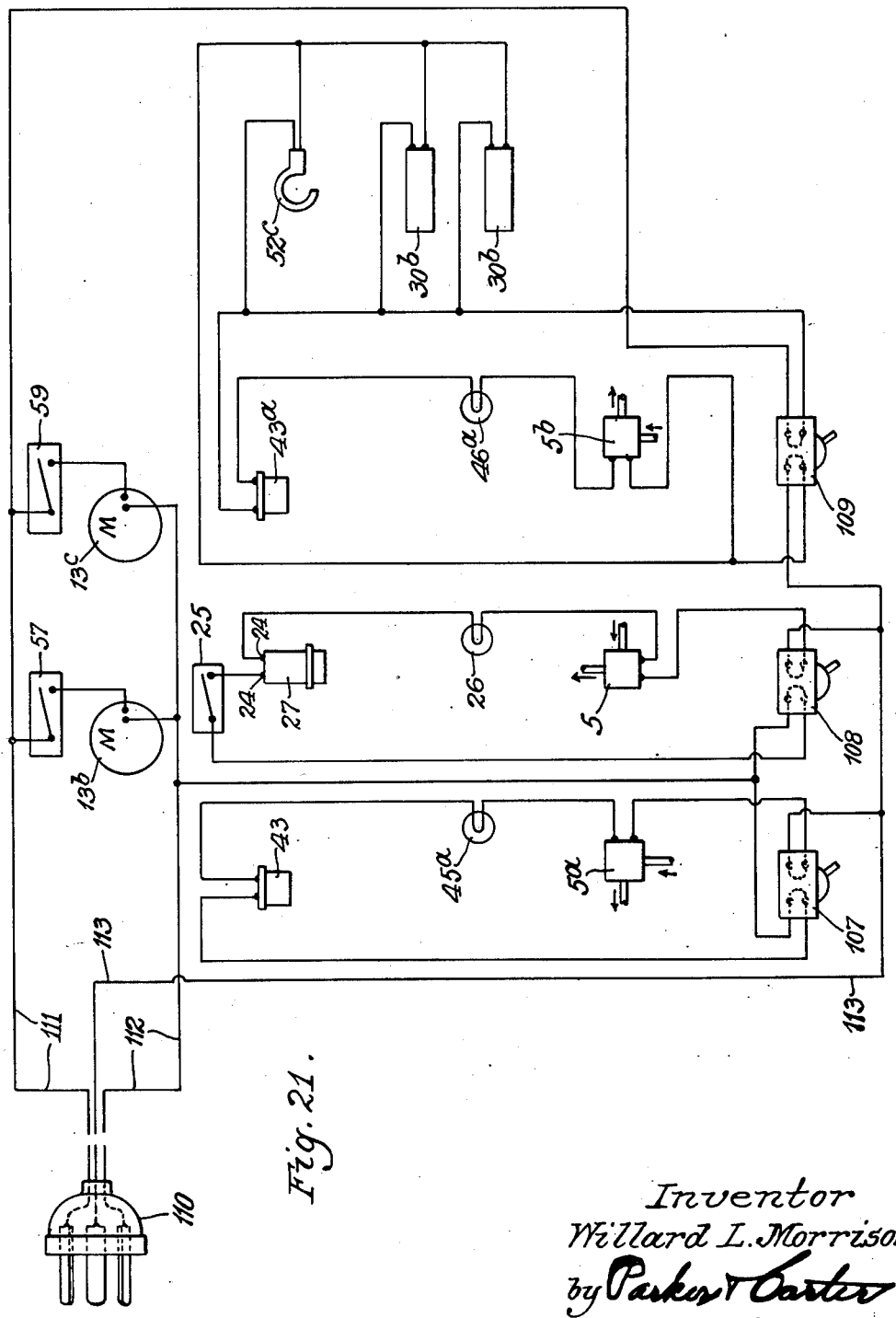
Fig. 21 is a view of the electric wiring diagram.

My invention has to do with a multistage means for producing very low temperatures by removing the heat from the evaporator or cold chamber to an intermediate heat exchanger with one refrigerating apparatus and from the intermediate heat interchanger to the atmosphere by means of another refrigerating apparatus.

In the device as shown there are three principal elements which are designated A, B and C. Element A is the evaporator or cold chamber which may be of any suitable construction but which is preferably of the type shown in Patent No. 2,356,779 issued August 29, 1944. This evaporator, designated generally by the numeral 6, comprises two cylinders 1a, 1b of heat conducting material with a space between them in which is located a series of passageway forming elements 1c. These passageway forming elements are shorter than the cylinders and every alternate element extends from the top of the cylinders to a point near the bottom of the cylinders and every other of the passageway forming elements extends from the bottom of the cylinders to a point near the top of the cylinders, so that there are a plurality of passages extending parallel to the cylinders and connected together at the top and bottom so as to form a continuous back and forth passageway in the space between the cylinders. The space between the edges of the cylinders at the top and bottom are closed and sealed.

The passageway forming elements 1c are rods preferably cylindrical in shape. These rods are loosely held in between the cylinders 1a and 1b that a portion of the refrigerant, which is passing along these passages when the device is in operation, will leak past them so as to contact the entire surface of the cylinders and make the cylinders continuous primary cooling surfaces. The cylinders 1a and 1b are surrounded by heat insulating material 1d.

The element B comprises a refrigerating apparatus consisting of the usual compressor and a motor for operating it, which compressor receives the vaporized refrigerant from the evaporator of element A and compresses it and delivers it to the condenser-receiver 1 intermediate the elements B and C. This refrigerant is an extremely volatile refrigerant, such as ethane, and it is condensed from a vapor to a liquid and delivered to the expansion valve 5 and then to the evaporator of element A.

Element C comprises a second refrigerating apparatus having the usual compressor and motor for operating it. This element C uses a different refrigerant, less volatile than ethane, such as propane. The refrigerating apparatus C has air cooled condensers and the condensed refrigerant is passed through an expansion valve to the coil in the condenser-receiver 1 and acts to cool the ethane refrigerant from the refrigerating apparatus B. The refrigerant ethane in the condenser-receiver 1 collects as a liquid in the bottom thereof.

Referring now to Figs. 1 and 2, this liquid ethane refrigerant, while at a relatively high pressure is at a sub-zero temperature and passes from the bottom of the condenser-receiver 1 through central liquid tube 2 (Figs. 18 and 19) and through an ethane liquid line 3, through a dryer 4 to an electro-magnetic expansion valve 5 which is mounted in proximity to the annular cold chamber 6 or other evaporator in which it is desired to produce the extremely low temperature.

The electro-magnetic expansion valve 5 is normally closed so that the ethane is prevented thereby from entering the evaporator 6.

The evaporator 6 is connected by a suction line 7 through a strainer 8 by bulb 9 of a thermostatic switch 25 and a low pressure safety valve 10, into the inlet 7a of a throttling contactor 27, separately shown in Figs. 3, 4 and 5. This throttling contactor has two functions, namely, to limit the maximum amount of pressure that can be transferred from the inlet through the outlet to the suction side of the compressor, and by means of a mercury switch, to be hereafter described, to control the amount of pressure to which the suction side of the compressor is subjected. From the outlet 11 of the throttling contactor, a suction line 11a connects to the inlet 12b of an oil venturi 12 to the intake side of the compressor 13 which is driven by an electric motor 13b.

Assuming that the compressor is running, the pressure will be reduced on the outlet side 14 of the throttling contactor 27 which is connected through multiple openings 15 to the outside of the metallic bellows 16. This reduction in pressure, when it reaches a predetermined value, will cause the combined effect of spring 17 and the atmospheric pressure on the inside of bellows 16 to move the bottom end downwardly, as shown in Fig. 3, thereby moving the balanced valves 18 and 19 away from the respective seats and permitting gaseous refrigerant to flow through the valves from the evaporator to the compressor. As the gaseous refrigerant in the evaporator is progressively removed, the resulting reduction in pressure causes the bottom end of the bellows 16 to move farther down so that the attached rod 20 operating through a stirrup 21 and a pivot 22 will cause sufficient inclination of the mercury switch 23 so that the mercury will move longitudinally within the switch and close contact between the points 24.

Because of the relative stiffness of bellows 16, there is a tendency to deflect the rod 20 from a truly central position so that if the valves 18 and 19 were rigidly connected thereto there would be difficulty experienced in having both of the valves 18 and 19 seat centrally and accurately into their respective seats. In order to eliminate this difficulty, the rod 20 has been separated from its corresponding rod 20a and interposed between them is a joint which maintains their longitudinal relation approximately intact, but permits lateral and angular freedom between them. To this end, a valve rod 20a is provided which terminates in a spherical end and which is held freely by the two rings 20b and 20c. These rings are free to move laterally within a chamber formed by a ball housing 20d and abutment plug 20e. The axial relation of the abutment plug 20e, which screws into a threaded opening in the housing 20f, and the dimensional relation between the facing of the housing thus formed being determined by a spacer sleeve. The whole with the ball forming a connection flexible angularly and laterally, and relatively rigid longitudinally.

The points 24, (Figs. 2 and 21) are included in a 110 volt circuit in series with a thermostatic control switch 25, (Figs. 2 and 21) a resistance lamp 26 (Figs. 2 and 21) and the electro-magnetic valve 5 (Figs. 2 and 21), so that when the circuit is closed through the mercury contacting the switch points, current will flow through the circuit and operate the electro-magnetic value 5, causing it to open and permitting liquid refrigerant to pass through pipe 5c and enter the evaporator 6. This causes the rapid evaporation of the liquid refrigerant, causing an immediate increase of pressure in the evaporator and its associated parts, which includes the bellows 16 of the throttling contactor 27 (Figs. 2, 3 and 21), and causes the bottom end of the bellows 16 to rise, causing an angular movement of the mercury switch 23 which breaks the contact at the switch points 24, thereby permitting the electro-magnetic valve to close and stop the flow of refrigerant into the evaporator 6. This entire operation ordinarily takes place in a short space of time so that the admission of refrigerant into the evaporator takes place by very short spurts. The evaporated refrigerant now passes from the evaporator through suction line 7, strainer 8 into the inlet 7a of suction throttling contactor valve 27 and through the valves 18 and 19 and out exit 11 and conductor 11a and through venturi 12 into the low side of compressor 13 where it is compressed.

The compressed gas, now containing a small amount of oil which has been introduced from the crankcase of the compressor 13, is now conducted through the pressure line 28 to a top central inlet 29 of an oil separator 30 (Figs. 1, 2 and 16). The gas containing this small portion of oil goes down from the inlet 29 to a small aperture 31 on the side of an extension 29a of the inlet 29, which is of such size that the oily gas issues from it at high velocity and impinges against the inside of a cylindrical tube 32. The diameter of this tube is relatively large with respect to the aperture 31 so that the compressed gas, now freed from a part of its oil which has clung to the side of the cylindrical tube 32, moves with relative slowness around the center tube and gradually accelerates until it leaves the orifice 33 on the opposite side of the tube 32 and again impinges with high velocity against the inside cylindrical surface of a tube 34. This successive impinging, retarding and accelerating is repeated three more times in tubes 34, 35 and 36, through orifices 34a, 35a and 36a respectively. The compressed gas, now completely freed of oil, issues from an outlet 37 and passes through a high side conductor tube 38 to a superheat suppressing venturi 39, and from there into the top of the condenser-receiver 1. Interposed in the tube 38 between the oil separator 30 and the condenser-receiver 1 are the check valve 38a and the high pressure safety valve 38b.

The superheat suppressing venturi 39, shown in detail in Fig. 20, causes the hot gas to accelerate, by constant acceleration with respect to time, so that in the throat 40 the pressure of the gas has been reduced by the velocity to an amount lower than the pressure at either end of the venturi by several pounds per square inch.

The throat of venturi 40 is connected by means of a tube 41 to the liquid tube 2 and, because of the low pressure at throat 40, liquid refrigerant mixes with a stream of hot compressed gas and is thereby reduced to a mist which presents a very large superficial area to the gas, thereby causing a very rapid evaporation of the mist of liquid refrigerant. This evaporation absorbs the superheat due to the compression so that the gas, mixed with a small surplus of liquid refrigerant, enters the open space at the top of the condenser-receiver 1 at a temperature but little higher than that of the liquid at the bottom thereof.

Within the condenser-receiver 1, and placed as far as possible towards the upper end, is a cooling coil 42 which serves as an evaporator for a separate refrigerating system C to be described later and which extracts the latent heat from the compressed gas causing it to condense and drop to the bottom as a liquid. The absorption of the super-heat by the atomized mist of refrigerant reduces very materially the amount of surface necessary in coil 42 to remove this latent heat for condensation.

The oil, which has been separated from the compressed gases, flows down along the sides of various cylindrical baffles and, since they are open at the bottom, the oil accumulates in the lower half of the oil separator and forms various levels in the various baffles due to the difference in pressure between them, which differences produce the acceleration in the various apertures. This oil has been removed from the compressor crankcase and it is necessary that it be returned when needed. To this end, we have provided a float chamber 43, shown separately in Figs. 6 and 7. This float chamber 43 is connected at the top by the tube 43d and at the bottom by tube 43e to the crankcase of the compressor 13, which assures that the level of the oil in the float chamber 43 is identical to that of the crankcase of compressor 13. Within the float chamber 43 there is a hollow float 44, shown separately in Figs. 6 and 7, which is secured by a hinge member 44a so that as the level of the oil in the chamber changes, the angular relation of float to the chamber varies.

Within the float chamber 43 is mounted a mercury switch 45, so placed that the effect of the lowering of the oil level will be to close the contacts in the mercury switch 45. In order to avoid the possibility of failure of the float, due to a difference in pressure between the outside and inside, this float is provided with an opening 46 at the top. At times there is liable to be rather sudden changes in pressure in the inside of the float chamber which is likely to produce "foaming" of the oil, and as a consequence, oil may become lodged within the float 44 through the opening 46, thereby altering its buoyancy. To eliminate this tendency, there is provided a tube 47 which passes through the opening 46 without making contact therewith and which tube is rigidly fastened to the top of the float chamber.

Mounted on the cover plate 43a is the bracket 43b having a pin 43c pivotally supporting the switch clip at its center. Near one end of switch clip 45a are pivoted the links 45b. The lower ends of links 45b are pivoted at 45c to the top of float 44. It will be noted that the projected distance from the pin part 44a forming the hinge of the float and the pivot 45c is many times greater than the distance between the pivots 43c and 45b, thus providing a multiplication of angular relation which causes operation of the mercury switch with a relatively small change in the level of the oil in the float chamber 43.

The lower end of the tube 47 is close to, but not in contact with, the bottom of float 44, and the tube 47 is connected by means of a tube 48 to the throat of the oil venturi 12, shown in detail in Fig. 15. This throat is at a considerably lower pressure than the inside of the float 44 and any oil which may accumulate therein is thereby forced through the tubes 47 and 48 into the throat of the venturi 12, and the float 44 is thereby kept relatively free from oil.

The bottom of the oil separator 30 is connected by a tube 49 through a strainer and dryer 50 and the electro-magnetic valve 5a to the bottom of the crankcase of the compressor 13. This electro-magnetic valve 5a is contained in an electrical circuit including the float switch 45 and a resistance lamp 45a. This lamp also acts as a visible signal.

When, during the operation of the compressor, sufficient oil has escaped from the crankcase of the compressor 13, thereby lowering the level in the crankcase and at the same time in the float chamber of the float 44, so that the mercury switch 45 establishes contact in the circuit, the electro-magnetic valve 5a, identical in construction with the electro-magnetic valve 5, is thereby energized and opened, and oil from the separator 30 is returned to the crankcase of the compressor 13, until the level is sufficiently restored to again break the contact in the switch 45.

In order to remove the latent heat from the oil free gas which has been introduced into the top of the condenser-receiver 1, thereby causing it to condense into a liquid, we provide an additional refrigerating system C quite similar in its construction to the one just described, illustrated at B. In this system liquid refrigerant, such as propane, is conducted from a receiver 51, through a strainer 51a in the line 51b to a vapor filled thermostatic expansion valve 52, through a tube 52b to the inlet 53 of the cooling coil 42, through a coil 42 by the outlet 54 and tube 54b past the thermostatic bulb 52a of expansion valve 52, through a strainer 54c, hand throttle 54d to the inlet 54e to the venturi 12a and into the compressor 13a where it becomes compressed by this compressor which is driven by an electric motor 13c.

The compressed gas, now containing a small quantity of oil from the compressor crankcase, is conducted through a pressure line 28a into the oil separator 30a and, after having had the oil removed in a manner exactly analogous to that described for the ethane compressor, the hot gas is conducted through a tube 55b to an adjacent air condenser 55, where a large proportion of the superheat is removed from the gas, and then through tube 55c to the air condenser 55a of the other unit B, where the remainder of the superheat and all of the latent heat is transferred to the atmosphere and the condensed liquid is returned to the receiver 51 by means of a tube 56.

Due to the interposition of the expansion valve 52 and the operation of the compressor 13a, there is a sudden reduction of pressure in the expansion valve 52 which causes ebullition of the propane refrigerant in the coil 42 which absorbs the latent heat from the ethane gas in the receiver-condenser 1 and causes its condensation.

The oil, which has been separated from the propane refrigerant, is conducted back to the crankcase of the compressor 13a in a manner exactly analogous to that used on the ethane compressor, and is controlled by the float system 43a controlling the electro-magnetic valve 5b and a visible resistance lamp 46a.

Mention has heretofore been made of the bulb 9 of the thermostatic switch 25 which is in thermal contact with the suction line 7 connecting the cold chamber with the ethane compressor 13 of element B. The function of this bulb and its attached control will now be explained.

When the temperature of the annulus of the cold chamber has been reduced to the point where there is relatively small difference between such temperature and that of the liquid ethane as it issues from the magnetic valve 5 through the pipe 5c, the ebullition of the liquid refrigerant in the annulus will cause some of it to pass out of the cold chamber or evaporator 6 through the suction line 7 and contact with the bulb 9 of the thermostatic control 25 of element B. When this bulb has been chilled to a predetermined temperature, it causes the switch 25 to open, thereby preventing the further opening of the electro-magnetic valve 5 and the further admission of liquid ethane into the annulus of the cold chamber. As a consequence, the pressure of the refrigerant in the annulus is progressively decreased until it reaches a value previously determined as a minimum. The low side of a dual pressure control 57, which is connected by means of a tube 58 to the crankcase of the compressor 13, has been adjusted so that when this predetermined low pressure has been reached, this dual pressure control breaks the circuit of the motor driving the compressor 13 and it ceases operating.

Under these conditions, heat is no longer being supplied to the condenser-receiver 1 and as a consequence of the action of the thermostatic valve 52, the pressure on the suction side of the propane compressor 13a progressively decreases. This pressure is communicated to a low pressure control 59 by means of a tube 60 which is connected to the low pressure side of the compressor 13a. This low pressure control 59 breaks the circuit of the motor 13c driving the propane compressor 13a of element C when a predetermined minimum pressure has been reached and that compressor also ceases operation. A heater or stabilizer 52c, such as is shown in my application Serial Number 423,023 now Patent No. 2,391,030 granted December 18, 1945, placed around the expansion valve 52 to avoid any trouble which might be caused by ice forming within the valve.

When the suction line contact with the thermostatic bulb 9 becomes warmer, due to the contact of the ambient atmosphere, the pressure in this bulb causes the thermostatic control 25 to close, thus permitting current to again flow through the magnetic valve 5 and admitting refrigerant into the annulus of the cold chamber. This is accompanied by a rise of pressure which, actuating the low pressure bulb of the dual pressure control 57, again causes it to reestablish the circuit in the motor 13b driving the ethane compressor 13 of element B. This compressor 13, now again driving heat to the cooling coil 42 in receiver-condenser 1, causes a rise of pressure in the crankcase of compressor 13a which, being connected by a tube 60 to the low pressure control 59 reestablishes the circuit of the motor 13c driving the compressor 13a and the machine is again in full operation. If at any time the propane compressor 13a should fail to operate for any reason and thereby fail to absorb the heat which the ethane compressor 13 is pouring onto the cooling coil 42, there will be a progressive rise of pressure in the oil separator 30 and its associated parts. This, being connected by means of a tube 61 to the high side of the dual pressure control 57, causes it to break the circuit of the motor 13b driving compressor 13 and stopping further rise of pressure except that occasioned by infiltration of heat from atmosphere to the refrigerant in the receiver-condenser 1.

Fig. 16 shows that oil separators 30 and 30a are mounted within a can or covering 62 and spaced therefrom so as to provide room for the insulation 63, inasmuch as it is designed to avoid any heat transfer from these units. The separator 30a is provided with the electric heaters 30b to keep the oil in a sufficiently warm condition to prevent the condensation of propane within the oil when the propane compressor resumes operation after being shut down. It will also be noted in referring to Fig. 19 that the receiver-condenser 1 is provided with a similar jacket 64, also for the purpose of providing space for insulation 65. This insulation is provided because, under normal circumstances, this receiver-condenser is at a sub-zero temperature and valuable refrigeration would be lost, besides the unsightly effect of condensation on its surface, if it were not provided with proper insulation.

The electro-magnetic valve, illustrated in Figs. 9 to 13, will now be explained in detail.

This electro-magnetic valve may be divided into two main units or divisions, namely, the mechanical portion and the electrical portion. The electrical portion consists of an iron-clad electromagnet, comprising a magnet core 66, an enlarged portion of which constitutes one pole face of the electro-magnet, and the opposite end of the core 67 terminating in a tapered neck which engages with a soft steel yoke 68, which yoke in turn engages with a magnet shell 69. Before pressing the yoke 68 onto the tapered neck of the core 67, a core insulator 70 is placed around the cylindrical portion of the core, and coil washers 71 are in turn placed around the core insulator 70.

The terminal plates 72 are soldered to terminal screws 73 and, in conjunction with a three-hole fiber disc 74, are also placed in position around the core insulator 70, after which the steel yoke 68 is pressed in place. The winding of magnet wire is then applied, one end of the winding being attached to each of the two terminal plates 72 and thereby to each of the two terminal screws 73. It will be noticed that these terminal screws 73 are electrically insulated from the steel yoke 68 by an insulating bushing 75, so that the winding is insulated from electrical contact with the iron portions of the electro-magnetic structure. The soft steel shell 69 is then pressed in place around the steel yoke 68 so that the enlarged face 105 of the core 66 and the inwardly projecting face 106 of the shell 69 lie in the same plane. The shell 69 is then securely attached to the yoke 68 by means of electric welding. To the face of the yoke opposite the winding is applied one of two magnet insulating washers 76 and retained by means of the thin flat head of the terminal screw 77. Another magnet insulating washer 76a is placed over the terminal post 77 and brought into contact with the opposite side of the thin flat head thereof from the other magnet insulating washer 76. This entire unit is now placed within the brass chamber 78. The terminal screws 77, passing through a post bushing 79 placed within enlarged holes in the end of the brass chamber 78, perform two functions: They support the iron-clad magnet structure within the brass chamber; and they seal the holes in the brass chamber 78 by the effect of the flat heads on the terminal screws 77 and magnetic insulating washers 76 and 76a which cover these enlarged holes and prevent leakage therethrough.

The outer washer 76a is held in intimate contact with the end of the brass chamber 78 by means of the following assembly construction: A terminal insulator 79a is placed over the ends of the terminal screws 77 against the end of the brass chamber 78. Then there is a post washer 80 and a terminal post spring 81, another brass washer 82 and finally hex nuts 83 are screwed onto the terminal posts 77, holding everything firmly in place by compressing the terminal post spring 81. Before the iron-clad magnet is assembled, the magnet washers 76 and 76a are painted with very heavy shellac which assists materially in preventing leakage between the washers 76 and 76a and the end of the brass chamber 78.

The mechanical portion of the valve consists of an inlet fitting 84a screwed into the side of the brass chamber 78 and an outlet fitting 84 which is screwed into the plate 85 and is anchored there against the possibility of turning by means of a key 86, as shown in Fig. 9, which is driven into a hole drilled in the pitch line of the thread (shown near the thread for clearness), uniting the plate 85 with the fitting 84. The portion of the fitting 84, which extends beyond the plate 85, is reduced in diameter to serve as a guide for two cylindrical posts 87 and a rectangular post 88, hereinafter to be described.

The central hole in the extended portion of the fitting 84 is taper-reamed to receive the tapered end of valve seat 89, while clamped between the head of the valve seat 89 and fitting 84 is an abutment screw support 90. This screw support 90 supports a plain abutment screw 91 and a slotted abutment screw 92, the free ends of which screws extend into properly placed holes in the plate 85, the abutment screws each carrying a hex nut 93 with which to adjust their axial location. A valve plate 94 is provided with three small steel balls 95, 96, 97 welded or otherwise anchored thereto, two of which, by engagement with abutment screws 92 and 91, serve as hinge members for the valve plate, the other one of which serves as the valve member engaging with the valve seat 89. The valve plate 94 is provided with a countersunk hole, symmetrically located with respect to the two hinge balls and approximately one-third of the distance between a line joining the two hinge balls and the valve balls. Through this countersunk hole passes the flat head machine screw 98, which engages a few turns of the valve spring 99 by being screwed into the interior of said spring, the convolutions of the spring serving as threads. The other end of the spring 99 is engaged with a headless screw 100 by similar means, and this headless screw is connected with the plate 85 by being screwed into a hole tapped therein. By means of this combination of screws 100 and 98 and spring 99, a strain is applied to the valve plate 94, which holds the hinge balls into contact with the abutment screws 92 and 91 and the valve ball into valving relation with the valve seat 89. An armature 101 is provided which, when the plate 85 is screwed into the open thread end of the brass chamber 78, is brought into fairly close juxtaposition with the pole faces of the iron-clad electro-magnet. The lateral location of the armature 101 is secured by means of two cylindrical posts 87 and a post of rectangular section 88, these posts being securely fastened to armature 101 by means of flat head screws 104, as previously described. These posts are located about the reduced extended portion of fitting 84 so as to keep armature 101 centrally located about the fitting 84, and at the same time maintain a proper clearance between the armature and the valve plate 94.

The small end of the valve plate 94 (Fig. 13) is extended to engage with the projecting part of the rectangular post 88. By means of this relation between the valve plate 94 and the rectangular post 88, the armature 101, when attracted by the electro magnetic effect of the iron-clad magnet assembly, raises the extended end of the valve plate 94, thus lifting the valve ball from the seat 89 until armature 101 contacts the pole faces 105 and 106 of the electro-magnet assembly. This movement of the armature and of the valve plate is resisted by the retractile effect of spring 99 so that upon the discontinuance of the current in the electro-magnet, the spring 99 causes the valve plate 94 and armature 101 to have a return movement until the valve ball fits into the seat 89 and the posts 87 and 88 are stopped by the plate 85. It will be noted that the presence of posts 87 and 88 prevent the mass of armature 101 from hammering the valve ball into the seat 89, also that this construction eliminates any tendency of the hinge balls being lifted from the abutment screws 92 and 91.

It is also worthy of note that the use of the triangular relation of the valve orifice in the valve seat 89, the slot abutment 92 and the plain abutment screw 91 definitely locate the valve plate 94, both with respect to the plane occupied by the plate and its angular relation about the axis of the fitting 84.

After the plate 85 has been screwed into the open end of the brass chamber 78 a proper distance, so as to provide for the proper gap between the armature 101 and the pole faces 105 and 106, the body is hermetically sealed by closing the interstice between plate 85 and chamber 78 by means of a relatively low melting point solder, at the same time hermetically sealing the tapped hole through which passes the headless screw 100 and also the interstice between the fitting 84 and the plate 85. The fluid to be valved enters the brass chamber 78 through a side fixture 84a, as shown in Fig. 10, and then its pressure tends to assist the spring 99 in holding the valve shut so that the electro-magnetic attraction, which raises armature 101, must be sufficiently powerful to lift the valve from its seat against the pressure of the fluid within the brass chamber in addition to flexing the spring 99. Manually operated switches 107, 108 and 109 are provided to allow minor repairs or adjustments without shutting down the entire apparatus.

Fig. 21 is a diagrammatic view of the electric circuits used in this apparatus. The current is preferably fed from a 220–110 volt, three-wire system, being connected by means of a polarized three-prong connector 110, as shown at extreme upper left of Fig. 21. The 220 volt circuit of the two outer conductors is conducted from the conductor 111, through dual pressure control 57, through the ethane motor 13b, and back to the other 220 volt conductor 112; also from the conductor 111 through the low pressure control 59, through the propane motor 13c, and back to the conductor 112, thus operating the two motors on 220 volts when their respective switches are closed. The current is also led from conductor 111 through the right hand side of switch 109, through oil separator heaters 30b, in parallel with each other and with the propane expansion valve stabilizer 52c, and also in parallel with a series circuit containing consecutively propane oil float switch 43a, bulb 46a, and magnetic valve 5b. The entire current of these parallel units traverses the left side of the switch 109 to the neutral or grounded conductor 113, thus connecting the parallel circuits to a 110 volt circuit. Current from the 220 volt conductor 112 is led to the left side of switches 107 and 108. Current from the switch 107 passes through a series circuit consisting of the ethane oil float switch 43, bulb 45a, and the magnetic valve 5a, and from there through the right side of switch 107 to the grounded neutral conductor 113. From the left side of switch 108, current passes through a series circuit, comprising ethane frost back thermostatic control 25, ethane suction throttling contactor 27, bulb 26, magnetic expansion valve 5, then through the right side of switch 108 to the grounded neutral conductor 113, thus applying 110 volts across this series circuit.

It will thus be seen that current is travelling through the oil separator heaters 30b and the valve stabilizer 52c all the time that the plug is inserted in the line, and the switch 109 is thrown into the "on" position, and that the current through the magnetic valve 5b, controlling the propane oil system is controlled by the action of propane oil float switch 43a at all times when switch 109 is thrown in the "on" position. It is also evident that when switch 108 is thrown in the "on" position, the flow of current through the magnetic expansion valve 5, and therefore the flow of refrigerant into the system, is controlled by the combined action of the ethane frost-back thermostatic control 25 and the ethane suction throttling contactor 27, and that when the switch 107 is thrown in the "on" position, the flow of current through the ethane oil system magnetic valve 5a, which controls the return of oil to the ethane compressor crank case, is in turn controlled by the action of the ethane oil float switch 43, and that the control of the operation of the ethane motor 13b is performed entirely by the ethane dual pressure control 57, and that the operation of the propane motor 13c is controlled by the propane low pressure control 59.

In addition to the general apparatus and process, wherein the heat is removed from the gas leaving the evaporator in two stages, it will be seen from the foregoing that there is provided a refrigerating expansion valve system wherein there is electro-magnetic means for introducing liquid refrigerant into the evaporating space and an auxiliary space containing a fluid having a pressure controlled by the temperature of the refrigerated space. There is an electrical switch means, responsive to the differential of pressure between that of the evaporating space and that in the auxiliary space for electrically controlling the introduction of the refrigerant by the electro-magnetic means.

There is also provided a system for condensing the heated vapor, comprising velocity actuated means for mixing condensed liquid with the incoming superheated vapor to reduce the amount of superheat by the evaporation of the liquid.

It will further be seen that there is an apparatus constituting a liquid sprayer means for spraying liquid and gas, there being means for accelerating the velocity of the gas and its entrapped liquid and for ejecting them against a liquid removal surface, and means for retarding the velocity of the gas, partially dispossessed of its liquid, and moving it to a place where it is brought again under the influence of means for accelerating and ejecting, and the successive repetition of these means, so as to separate completely the entrapped liquid from the gas, and means for collecting the successive liquid separations into one unit.

I claim:

1. A refrigerating apparatus which includes an evaporator through which a refrigerant is passed, said evaporator being in the form of a container surrounding a space adapted to receive material to be treated, a super heat suppressing apparatus including a Venturi tube to which the refrigerant, after passing through the evaporator, is delivered, a heat removing apparatus to which the refrigerant is delivered from the super heat suppressing device and which removes heat therefrom, and means for delivering said refrigerant to the evaporator.

2. A refrigerating apparatus which includes an evaporator through which a refrigerant is passed, said evaporator being in the form of a container surrounding a space adapted to receive material to be treated, a super heat suppressing apparatus to which the refrigerant, after passing through the evaporator, is delivered, a heat removing apparatus to which the refrigerant is delivered from the super heat suppressing device, said heat removing device being provided with a different refrigerant from that used in the super heat suppressing apparatus, a coil through which the cooled refrigerant of the heat removing device is passed, a container for said coil, the cooled refrigerant from the super heat suppressing apparatus being passed through said container so as to be further cooled thereby, and means for returning said refrigerant to said evaporator.

3. A low temperature refrigerating apparatus comprising three general elements, an evaporator for cooling the material, said evaporator being in the form of a container surrounding a space adapted to receive the material to be cooled, said evaporator using a volatile refrigerant, a super heat suppressing device including a Venturi tube for removing heat from this refrigerant and a separate heat removing device for removing further heat from the refrigerant used in the evaporator.

4. In a refrigeration apparatus, a base, an evaporator-container on said base, including an evaporator surrounding and defining a space adapted to receive the material to be treated, a compressor-condenser on said base, in circuit with said evaporator, a second compressor-condenser on said base, a condenser receiver on said base, in circuit with said first-mentioned compressor-condenser and evaporator, an evaporator coil in said condenser receiver, in circuit with said second compressor-condenser, and means for actuating said compressors, the circuits which include said compressors being each provided with a refrigerant, the refrigerants of the two systems being of different volatility.

5. In a refrigeration apparatus, a base, an open topped evaporator-container on said base, including an evaporator surrounding and defining a space adapted to receive the material to be treated, a compressor on said base, in circuit with said evaporator, and a condenser receiver in circuit therewith, a second compressor and a condenser coil on said base, an evaporator coil, in circuit therewith, positioned within said condenser receiver, the circuits thus formed being provided each with a refrigerant, and means for simultaneously actuating the compressors of the two circuits.

6. In a refrigeration apparatus, an evaporator-container including an evaporator surrounding and defining a space adapted to receive the material to be treated, a compressor, and a condenser receiver, in circuit with said evaporator, a second compressor and condenser coil, and an evaporator coil in circuit therewith, said evaporator coil being positioned within said condenser receiver, the circuits thus formed being provided each with a refrigerant, and means for actuating the compressors of the two circuits.

WILLARD L. MORRISON.

REFERENCES CITED

The following references are of record in the file of this patent:

UNITED STATES PATENTS

| Number | Name | Date |
| --- | --- | --- |
| 1,808,494 | Carney | June 3, 1931 |
| 1,893,171 | Kagi | Jan. 3, 1933 |
| 1,904,590 | Wexler | Apr. 19, 1933 |
| 1,985,381 | Richards | Dec. 25, 1934 |
| 2,082,189 | Twomey | June 1, 1937 |
| 2,128,020 | Smilack | Aug. 23, 1938 |
| 2,195,220 | McGrath | Mar. 26, 1940 |
| 2,239,709 | Goldstein | Apr. 29, 1941 |
| 2,291,565 | Staebler | July 28, 1942 |
| 2,316,016 | Packie | Apr. 6, 1943 |
| 2,352,581 | Winkler | June 27, 1944 |
| 2,356,779 | Morrison | Aug. 29, 1944 |